B. G. RICHARDS.
VEHICLE JACK.
APPLICATION FILED OCT. 10, 1912.
1,098,639.
Patented June 2, 1914.
Fig. 1.
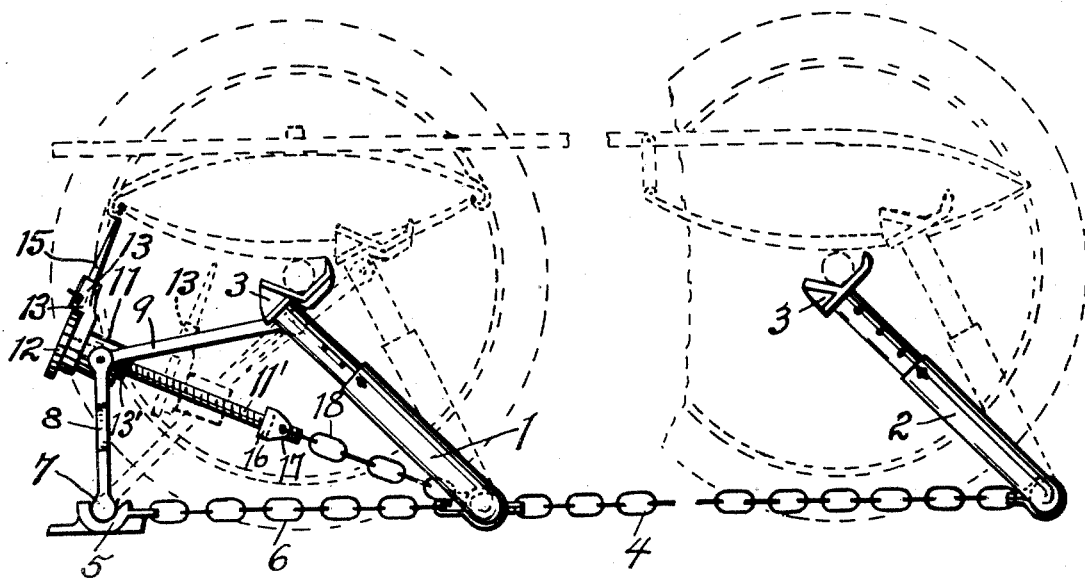
Fig. 2.
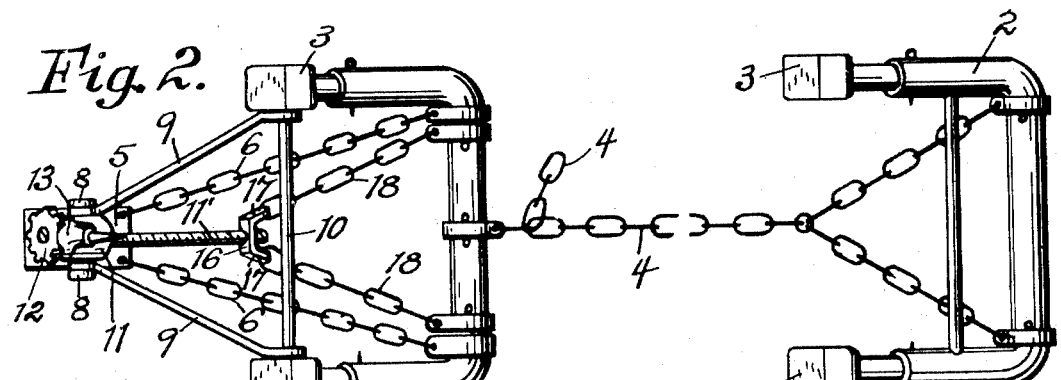
Fig. 3.
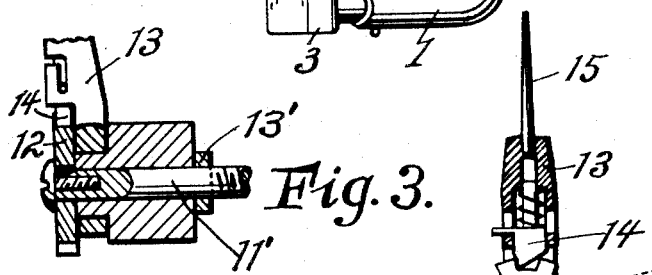
Fig. 5.
Fig. 4.
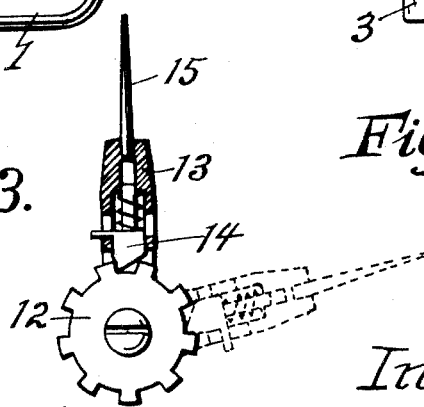
Witnesses:
T. Colson,
C. E. Wessels.
Inventor:
Brayton G. Richards,
By Joshua R. H. Potts
his Attorney.

UNITED STATES PATENT OFFICE.

BRAYTON G. RICHARDS, OF CHICAGO, ILLINOIS, ASSIGNOR TO HENRY S. WIKEL, OF YORK, PENNSYLVANIA.

VEHICLE-JACK.

1,098,639. Specification of Letters Patent. Patented June 2, 1914.

Application filed October 10, 1912. Serial No. 724,935.

*To all whom it may concern:*

Be it known that I, BRAYTON G. RICHARDS, a citizen of the United States, and a resident of the city of Chicago, county of Cook, and State of Illinois, have invented certain new and useful Improvements in Vehicle-Jacks, of which the following is a specification.

My invention relates to improvements in vehicle jacks of the type adapted to elevate simultaneously the four wheels of a vehicle, such as an automobile, from the ground, and has for its object the provision of an improved device of this character which is of simple construction and efficient in operation.

The invention consists in the combinations and arrangements of parts hereinafter described and claimed.

The invention will be best understood by reference to the accompanying drawings forming a part of this specification, and in which—

Figure 1 is a partial side view of a jack embodying my invention, the coöperating parts of an automobile being indicated diagrammatically in dotted lines, Fig. 2 is a top plan view of the jack corresponding to Fig. 1, Fig. 3 is a detail section through the central joint of a toggle joint employed in the construction, Fig. 4 is a view showing the form of the lower member of a toggle joint employed in the construction and the method of connecting the same at the central joint of said toggle joint, and Fig. 5 is a detail view illustrating a double acting pawl and ratchet construction for operating the jack.

The preferred form of construction as illustrated in the drawing comprises two independently swinging elevating arms 1 and 2 which are arranged to rest directly upon a floor or other supporting surface and swing upwardly to elevate the axles of a vehicle, as will be readily understood by those skilled in the art. Each of these elevating arms is made in substantially U-form, as shown in Fig. 2, and each of the limbs of said arms is provided with an adjustable axle rest 3 for engaging the axle of an automobile or similar vehicle. Arms 1 and 2 are connected together at their bases by means of a chain 4 which permits of ready longitudinal adjustment between said arms. A bearing block 5 is connected with the base portion of arm 1 by means of divergent chains 6, as shown, and serves as a rest and support for the lower end 7 of a toggle joint member 8. The other member of said toggle joint consists of two divergent bars 9 pivoted at their upper ends to a bar 10 connecting tread members 3 on arm 1. The lower ends of bars 9 and the upper end of member 8 are pivoted to a head 11 to constitute the central joint of the toggle
joint. A threaded shaft or screw 11′ is
passed loosely through head 11 and has a double acting ratchet wheel 12 secured to its outer end and resting against the outer end of head 11, as shown in Fig. 3. A collar 13′ is also secured to shaft 11′, as shown, to prevent longitudinal movement of head 11 on said shaft. A pawl arm 13 is swiveled on head 11, as shown, and carries a double acting spring held pawl 14 by means of which ratchet wheel 12, and consequently shaft 11′, may be rotated in either direction, as will be readily understood. Pawl arm 13 is provided with projection 15 which may be engaged by a suitable handle in order to increase the leverage if desired. At its inner end, shaft 11′ is threaded in a block or nut 16 which is provided with side lugs 17 secured to the base portion of arm 1 by means of divergent chains 18, as shown in Fig. 2.

In use, the rests 3 are engaged with the axles of the vehicle, as indicated in Fig. 1, and pawl arm 13 manipulated to operate toggle joint members 8 and 9 to elevate arm 1. Elevation of arm 1 moves the whole vehicle slightly longitudinally, such movement causing simultaneous operation of arm 2 to elevate that end of the vehicle. By employing the toggle joint arranged as shown, it will be observed, that the first movement of arm 1 produced by said toggle joint will be quite rapid in proportion to the movement of shaft 11′ so that all slack will be taken out of the different connections quite rapidly, but, of course, at a corresponding expense of power. However, during the first operation of the jack but little power is necessary to effect engagement of the parts and to take all slack out of the connections. As the operation of the toggle joint is continued, the relative movement of arms 1 produced thereby decreases thus correspondingly increasing the leverage exerted in elevating the vehicle. Thus, during the last part of the movement of the lifting arms, when the full weight of the vehicle is supported thereby, the leverage exerted will be very great, thus facilitating the elevation of the vehicle. By employing divergent chains to secure nut 16 in place, turning of said nut under strain is prevented. When it is desired to lower the vehicle to contact with the floor and remove the jack, pawl 14 is reversed, as will be readily understood, and pawl arm 13 employed in the usual manner to operate screw shaft 11' to effect this.

While I have illustrated and described the preferred form of construction for carrying my invention into effect, this is capable of variation and modification without departing from the spirit of the invention. I, therefore, do not wish to be limited to the construction set forth, but desire to avail myself of such variations and modifications as come within the scope of the appended claims.

Having described my invention, what I claim as new and desire to secure by Letters Patent is:

1. A vehicle jack comprising two elevating arms arranged to swing independently of each other; a bearing connected to one of said arms at its base; a toggle joint having one end resting in said bearing and the other end pivotally connected with the upper portion of said arm; a head pivotally mounted at the central joint of said toggle joint; a threaded shaft passing loosely through said head; a ratchet wheel secured to said shaft and resting against the outer end of said head; a pawl arm arranged to operate said ratchet in either direction; and a nut threaded on the inner end of said shaft and connected with the base of said arm by means of divergent chains, substantially as described.

2. A vehicle jack comprising two elevating arms arranged to swing independently of each other, each of said arms consisting of a substantially U-shaped member having axle rests at the upper ends of its limbs and adapted to swing upon a floor; a chain connecting said arms at their bases; a bearing block connected by means of chains with one of said arms at its base; a toggle joint having one end resting in said bearing and the other end pivotally connected with the upper portion of said arm; a head pivotally mounted at the central joint of said toggle joint; a threaded shaft passing loosely through said head; a ratchet wheel secured to said shaft and resting against the outer end of said head; a pawl arm arranged to operate said ratchet in either direction; and a nut threaded on the inner end of said shaft and connected with the base of said arm by means of divergent chains, substantially as described.

In testimony whereof I have signed my name to this specification in the presence of two subscribing witnesses.

BRAYTON G. RICHARDS.

Witnesses:
A. A. OLSON,
JOSHUA R. H. POTTS.